(12) United States Patent
Magriço et al.

(10) Patent No.: US 12,045,444 B2
(45) Date of Patent: Jul. 23, 2024

(54) PLAYBACK OF USER WEBSITE INTERACTIONS RELATED TO USER FEEDBACK

(71) Applicant: Content Square SAS, Paris (FR)

(72) Inventors: Pedro Magriço, Paris (FR); Chiara Felice Sant Cassia, Paris (FR); Rory O'Keeffe, Paris (FR); Luke Causon, Paris (FR); Samuel Gagnepain, Paris (FR); Weronika Terpilowska, Paris (FR); Julio Alegria, Paris (FR); Ntale Shadik, Paris (FR); Arturas Zakrevskis, Paris (FR)

(73) Assignee: Content Square SAS, Paris (FR)

(*) Notice: Subject to any disclaimer, the term of this patent is extended or adjusted under 35 U.S.C. 154(b) by 0 days.

(21) Appl. No.: 17/876,976

(22) Filed: Jul. 29, 2022

(65) Prior Publication Data
US 2023/0418443 A1    Dec. 28, 2023

Related U.S. Application Data

(60) Provisional application No. 63/354,986, filed on Jun. 23, 2022.

(51) Int. Cl.
| | |
|---|---|
| *G06F 3/0484* | (2022.01) |
| *G06F 3/0482* | (2013.01) |
| *G06F 3/0483* | (2013.01) |
| *G11B 27/34* | (2006.01) |

(52) U.S. Cl.
CPC .......... *G06F 3/0484* (2013.01); *G06F 3/0482* (2013.01); *G06F 3/0483* (2013.01); *G11B 27/34* (2013.01)

(58) Field of Classification Search
CPC .... G06F 3/0483; G06F 3/0482; G06F 3/0484; G11B 27/34
See application file for complete search history.

(56) References Cited

U.S. PATENT DOCUMENTS

| | | | | |
|---|---|---|---|---|
| 2005/0060183 | A1* | 3/2005 | Haupt | G06Q 30/0601 705/26.1 |
| 2007/0271511 | A1* | 11/2007 | Khopkar | G06F 40/106 707/E17.116 |

(Continued)

*Primary Examiner* — Andrea C Leggett

(57) ABSTRACT

Method for providing playback of user website interactions related to feedback starts with processor receiving, from client device, user activity data associated with interactions by user with a website displayed on client device during session and receiving feedback data from client device. Processor causes feedback list user interface to be displayed on display device that includes feedback entry comprising the feedback data associated with website and session. Processor causes feedback entry detail user interface to be displayed on display device that includes including information on session, feedback data, and playback selectable item. In response to receiving selection of playback selectable item, causing playback user interface to be displayed on display device that includes visualization of interactions by user with website that cause user to provide feedback data. Playback user interface comprises recording timeline that includes feedback marker indicating time in visualization that user provides feedback data. Other embodiments described herein.

21 Claims, 10 Drawing Sheets

(56) References Cited

U.S. PATENT DOCUMENTS

| | | | |
|---|---|---|---|
| 2014/0189714 A1* | 7/2014 | Lawbaugh | G06F 11/3644 |
| | | | 719/313 |
| 2014/0278920 A1* | 9/2014 | Holden | G06Q 30/0245 |
| | | | 705/14.44 |
| 2015/0012811 A1* | 1/2015 | Chan | G06F 16/958 |
| | | | 715/234 |
| 2017/0019489 A1* | 1/2017 | Churchill | G06Q 30/0201 |
| 2018/0067845 A1* | 3/2018 | Costello, Jr. | G06F 11/3688 |

* cited by examiner

PLAYBACK OF USER WEBSITE INTERACTIONS RELATED TO USER FEEDBACK

CROSS REFERENCED TO RELATED APPLICATIONS

This claims priority to U.S. Provisional Patent Application Ser. No. 63/354,986, filed Jun. 23, 2022, the contents of which are incorporated herein by reference in their entirety.

BACKGROUND

Electronic commerce (e-commerce) facilitates trillions of dollars in transactions yearly. Using their personal electronic devices, users can quickly and easily access a business' website or mobile application to purchase goods or services directly from the business.

It is imperative to understand the online customers' digital behaviors and gather insights therefrom. For example, the digital behaviors can include the navigational patterns of the user to the website or within the website as well as interactions with the elements displayed on the website. Improving the online customers' digital experience on the website will directly lead to increased sales and revenue growth from website or mobile application.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

In order to gather insights from the online customers, current websites allow for the customers to provide comments, reviews, or feedback on their products, services or on the website itself. For example, when an aspect of the website's functionality is causing frustration with the customer and the customer is unable to successfully complete their transaction on the website, the user may provide valuable feedback to the website owner regarding the aspect of the website's functionality that needs to be addressed. However, the feedback provided by the customer may not necessarily be adequately detailed such that the website owner may not be able to decipher and fix the issue with the website based on the feedback.

To better understand the online customers' provided feedback, the online customer's digital interactions on the webpage that prompted the feedback needs to be easily accessible and visualized. Among other things, embodiments of the present disclosure improve the functionality of digital experience tracking systems by providing an option alongside the feedback provided that allows for the playback of the user interactions with the website that prompted the feedback provided by the user.

By providing easy access to the visualization of the user's interactions with the webpage when reviewing the feedback provided, a website owner (e.g., a business) can quickly identify the specific causes of friction or frustration within their website, which led the user to submit the feedback provided and thus better understand it.

Networked Computing Environment

Figure 1:
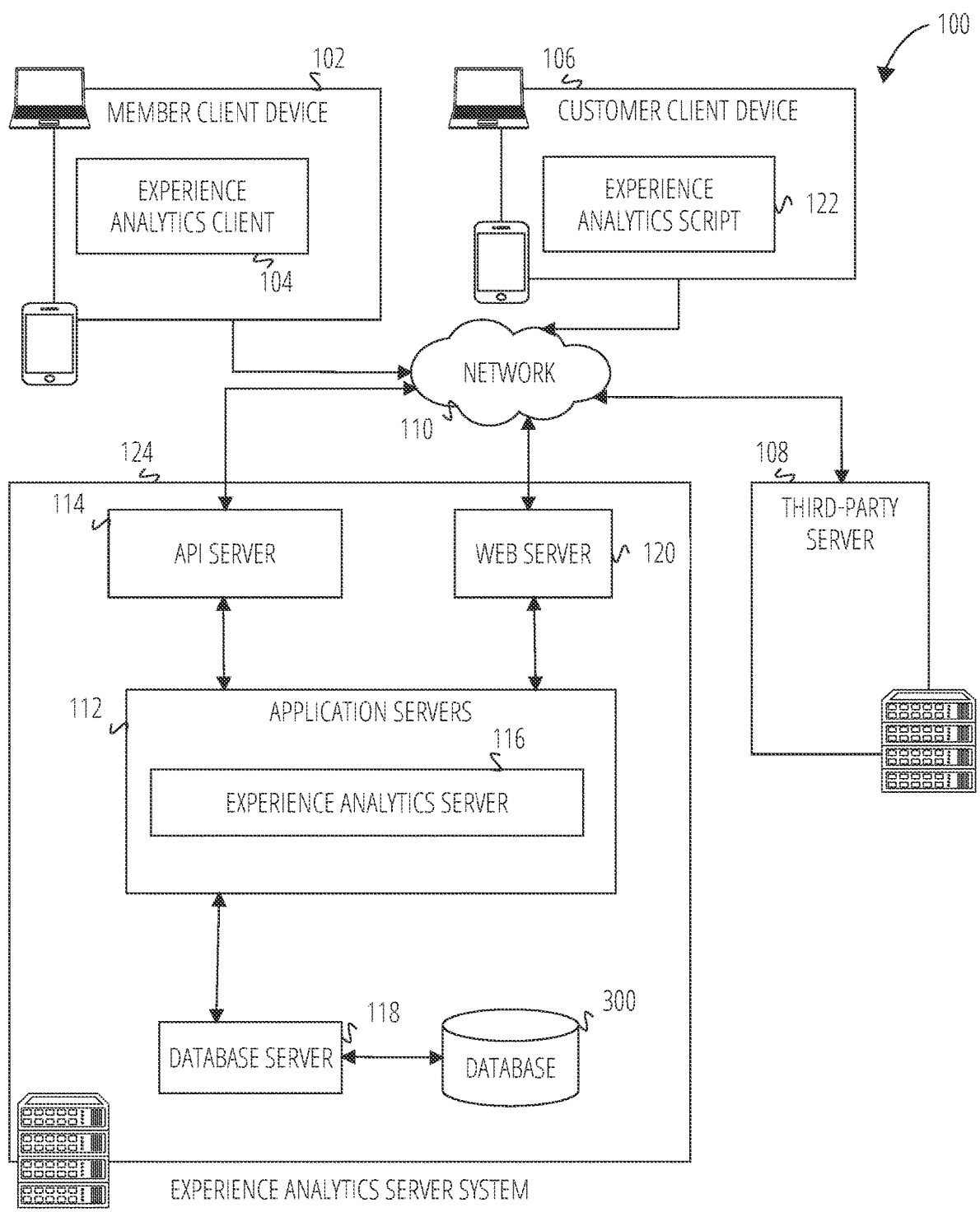
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning, and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. While shown as a single database 300 in FIG. 1, it is understood that a plurality of databases of various storage types can be used or any combination thereof. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning, and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning, and overlays to be applied on the website, feedback provided by the user into feedback forms or widgets on the website, etc. Other processor and memory intensive processing of data may also be performed server-side by the experience analytics server 116, in view of the hardware requirements for such processing.

System Architecture

Figure 2:
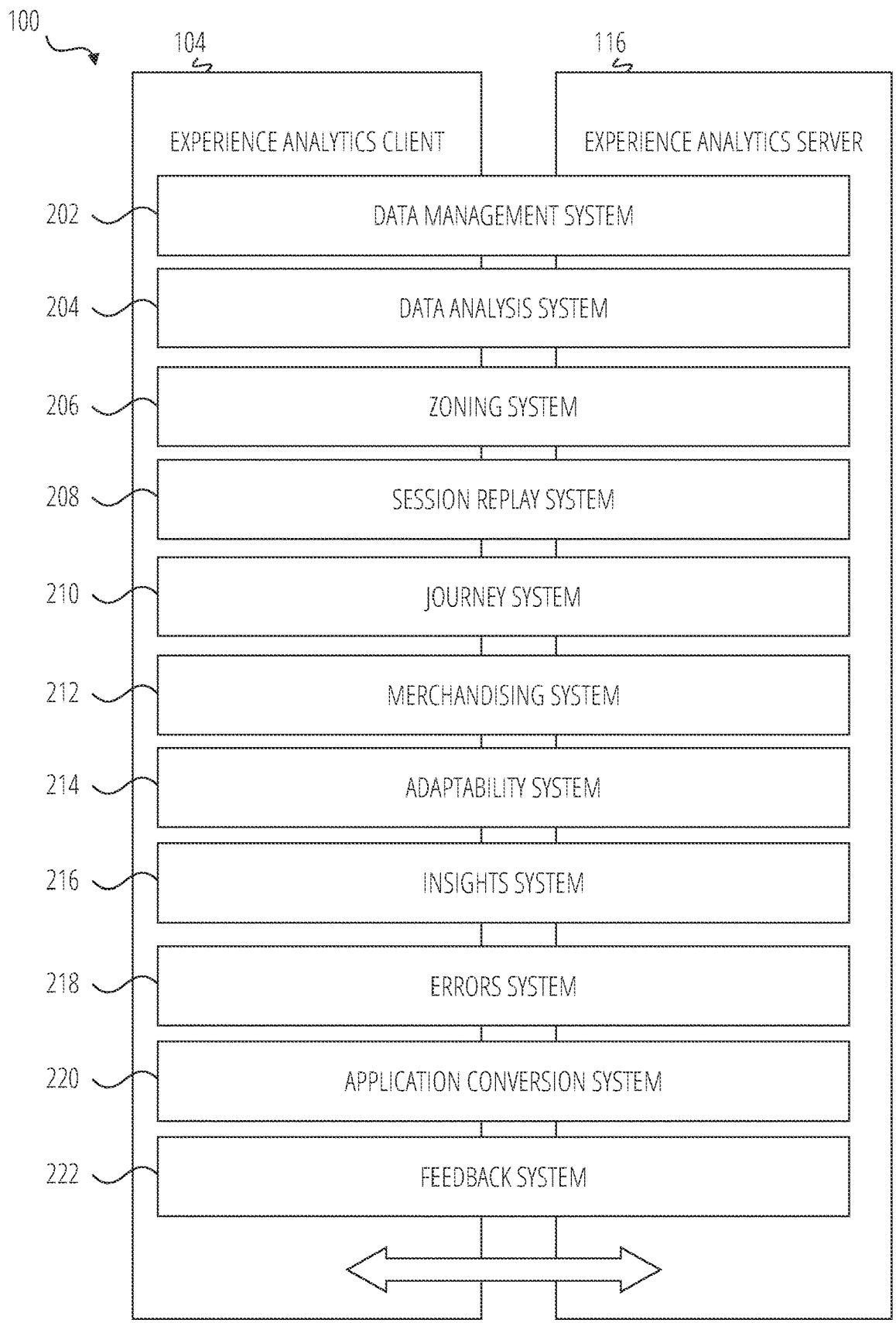
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations, or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for visitors that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

The feedback system 222 is responsible for receiving and analyzing data from the data management system 202 that includes the feedback data received from the client devices. As the visitor progresses through a client's website on the client device, a feedback webpage of the website, a pop-up window or tab, or an overlay can be displayed to receive the visitor's feedback. For instance, a feedback form can be displayed in a pop-up window or tab of the website, an overlay of the website, one of the plurality of webpages of the website, etc. The visitor can provide feedback on, for example, the functionality of the website, aesthetics of the website, on the goods and services associated with the website, etc. The feedback data can include a text input that is included into a feedback form on the website. The feedback data can also include a survey response, a rating that includes an image, an emoticon, or an icon, a screenshot of one of the plurality of webpages, etc. The feedback system 222 is also responsible for generating feedback interfaces to be displayed by the member client device 102 via the experience analytics client 104. Feedback interface can include the feedback list user interface, the feedback entry detail user interface, and playback user interface.

Data Architecture

Figure 3:
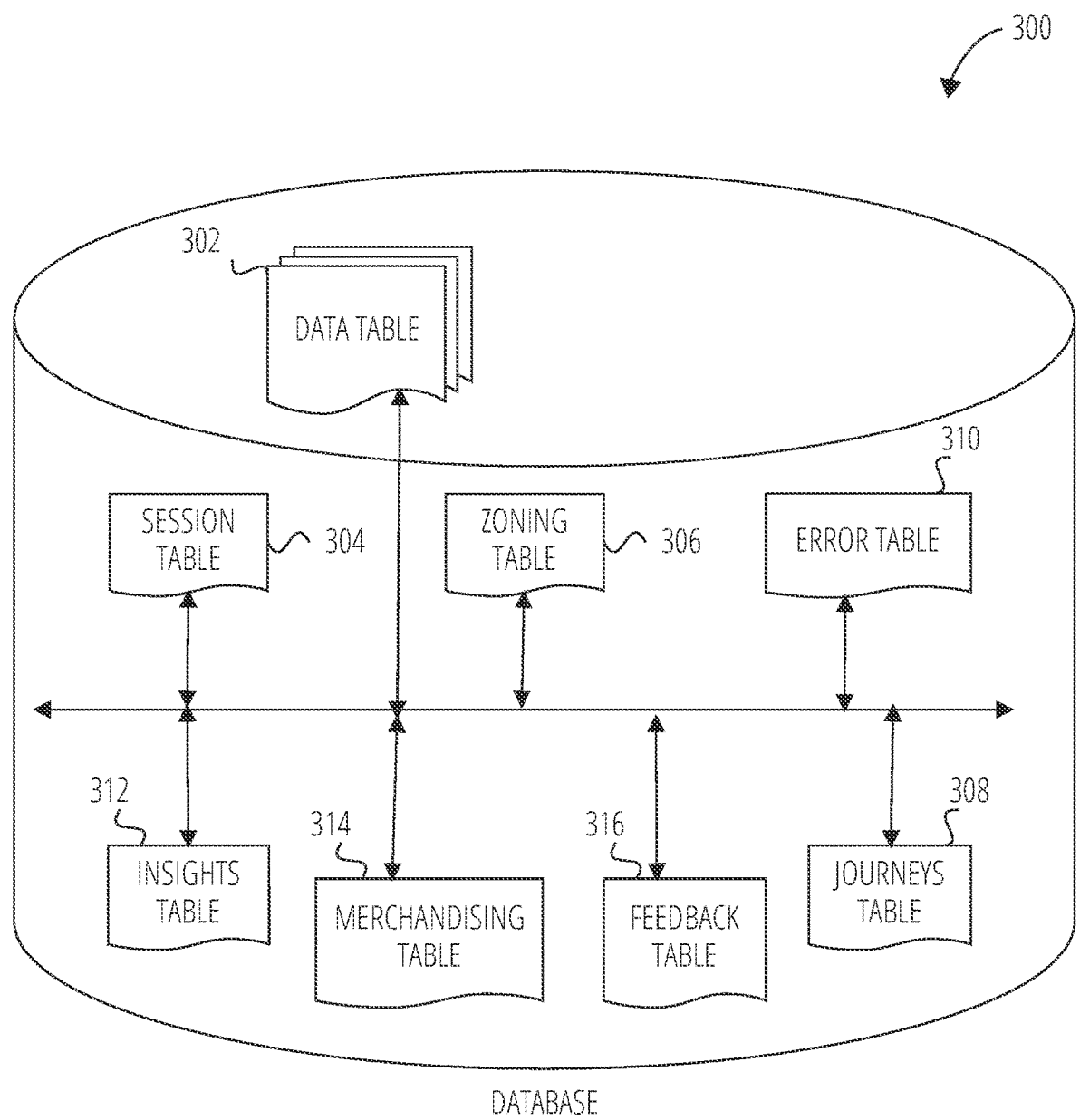
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database). Further, while FIG. 3 shows as a single database 300, it is understood that a plurality of databases of various storage types can be used or any combination thereof.

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

The feedback table 316 stores data associated with the feedback system 222. For example, the data in the feedback table 316 can include the feedback data received from each of the customer client devices 106 and stored in association with the customer client device 106 and the website associated with the customer client device 106. The feedback data can include, for example, the text input that provides the visitor's (or customer's) feedback on the website, survey response, rating that includes an image, an emoticon, or an icon, a screenshot of one of the plurality of webpages, etc.

Process of Providing a Playback of User Website Interactions Related to User Feedback Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
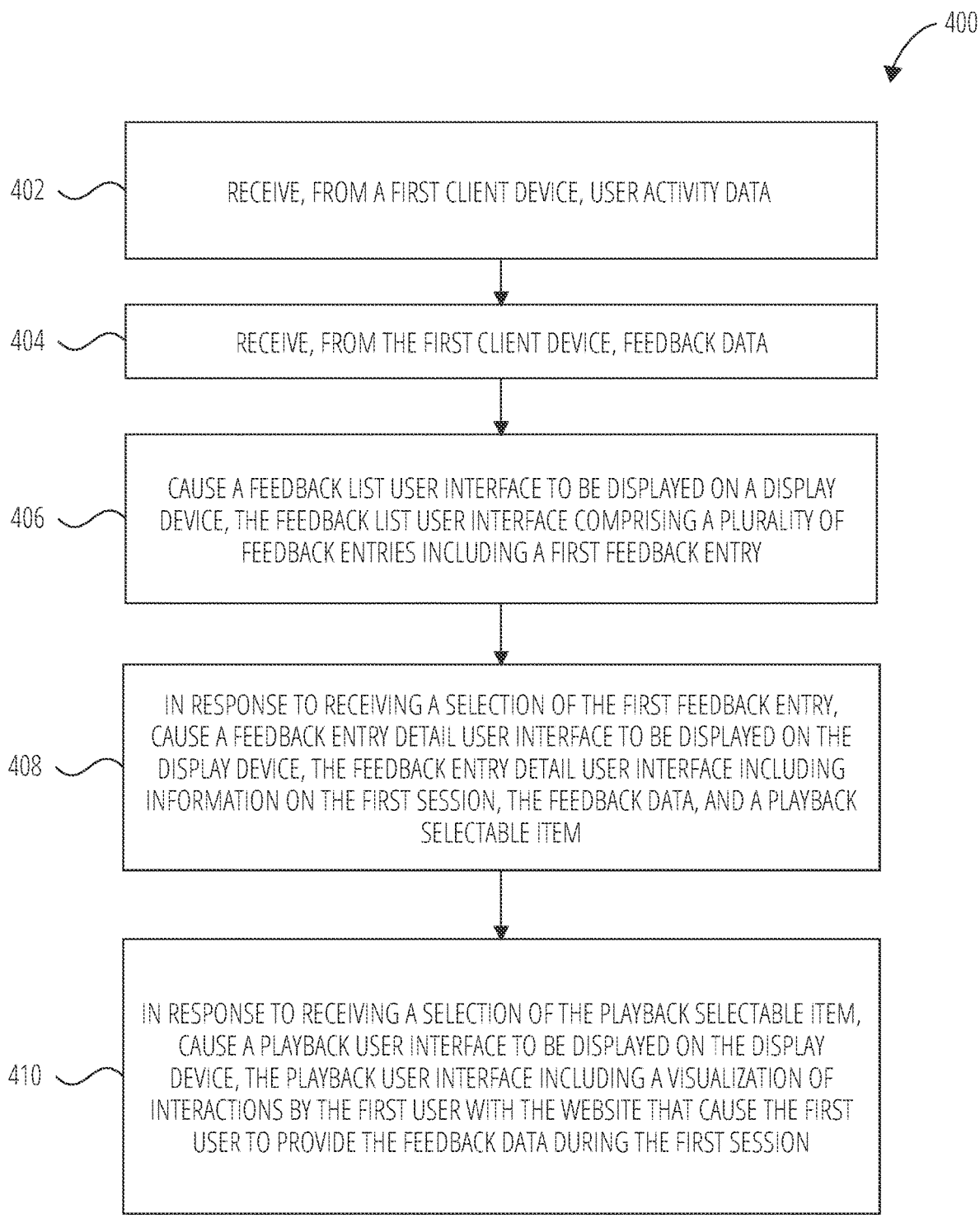
FIG. 4 illustrates a process 400 of providing a playback of user website interactions related to a user feedback in accordance with one embodiment.

FIG. 4 illustrates a process 400 of providing a playback of user website interactions related to a user feedback in accordance with one embodiment. The process 400 can be performed by a processor included in the feedback system 222, in any system in the experience analytics system 100, or any combination thereof.

As shown in FIG. 4, a processor receives, in operation 402, from a first client device, user activity data associated with interactions by a first user with a website displayed on the first client device. The user activity data can comprise changes in an interface of the website displayed on the first client device, elements on the website displayed or visible on the interface displayed on the first client device, text inputs by the users into the website displayed on the first client device, a movement of cursor of a mouse, touchpad or touch screen, a click or activation of the mouse, the touchpad, or the touch screen on the interface of the website, or any combination thereof.

The website can include a plurality of webpages displayed during a first session which is a session associated with the first user. The first session comprises a timeframe between an entry by the first user into the website and an exit by the user from the website. For example, the session starts when the user arrives into the website and ends upon the user's exit from the website.

During the session, the interface of the website displayed on the first client device can include a feedback form that can receive feedback data from the first user. The feedback form can be displayed in a pop-up window or tab of the website, an overlay of the website, one of the plurality of webpages of the website, or any combination thereof.

In operation 404, the processor receives, from the first client device, the feedback data associated with the website and the first session. The feedback data can include text input from the first user into the feedback form, a survey response, a rating that includes an image, an emoticon, or an icon, a screenshot of one of the plurality of webpages, or any combination thereof.

In operation 406, the processor causes a feedback list user interface 502 to be displayed on a display device. For example, the member client device 102 can comprise the display device such that the viewer of the display device is an agent of the client (e.g., a web administrator, an employee, etc.). The member client device 102 can also separate but coupled to the display device. The feedback list user interface 502 can comprise a plurality of feedback entries including a first feedback entry. Each of the feedback entries is associated with a feedback data that was received from a user navigating the website via a client device. For instance, the first feedback entry can include the feedback data associated with the website and the first session. Each of the feedback entries can be selectable items that are displayed in the feedback list user interface 502.

In one example, the first feedback entry can further include a user identifier associated with the first user, a session identifier associated with the first session, session details related to the first session, an address of the one of the plurality of webpages associated with the feedback data, a screenshot of the one of the plurality of webpages, the text input, or any combination thereof.

In response to receiving a selection of the first feedback entry from the first client device, at operation 408, the processor causes a feedback entry detail user interface 516 to be displayed on the display device. The selection of the first feedback entry can be received from the display device or from the member client device 102 that is coupled to the display device.

The feedback entry detail user interface 516 can include information on the first session, the feedback data, and a playback selectable item 518. The playback selectable item 518 can be an image, an icon, a text, or a link.

At operation 410, in response to receiving a selection of the playback selectable item 518, the processor causes a playback user interface 504 to be displayed on the display device. The selection of the playback selectable item 518 can be received from the display device or from the member client device 102 that is coupled to the display device.

The playback user interface 504 including a visualization of interactions by the first user with the website that cause the first user to provide the feedback data during the first session. The visualization of interactions by the first user with the website is generated based on the user activity data associated with the first user.

The playback user interface 504 includes a recording timeline 508 associated with the visualization. The recording timeline 508 can include a feedback marker 506 that indicates a time in the visualization that the first user provides the feedback data.

In one example, a video comprises the visualization of the interactions by the first user with the website. In response to receiving the selection of the recording playback selectable item, the processor loads the video on the playback user interface, causes the video to jump forward to a start time that is a predetermined period of time prior to the time in the visualization that the first user provides the feedback data, and causes the video to be played back starting at the start time on the display device. In this embodiment, the viewer of the display device is able to quickly view the interactions of the user with the website that occurred a predetermined period of time before the feedback data is provided. This allows the viewer to easily decipher via the visualization of the interactions the context of the feedback data that is provided. In one example, the start time can be a fixed predetermined period of time (e.g., 3 to 5 minutes) before the time in the visualization that the first user provides the feedback data (e.g., identified by the feedback marker 506). In another example, the start time is determined by the processor based on an analysis of the user activity data associated with the first user's interactions with the website. For example, the processor can determine that 2 minutes prior to the feedback data being provided, the first user mouse clicked in rapid succession (e.g., rage click) on an icon displayed on one of the webpages of the website (e.g., homepage). In this example, the processor can determine and set the start time to be 2 minutes (e.g., predetermined period of time) prior to the feedback data being provided based on the rage click being identified at that time in the visualization. The recording timeline 508 can also include a frustration marker 526 at the time at which the rage click can be seen in the visualization of the user's interactions.

The processor can cause a playback marker 510 that indicates a playback time in the video to be displayed and positioned at a position on the recording timeline 508 that corresponds to the start time. The playback marker 510 is positioned at the position in the recording timeline 508 that is prior to a position of the feedback marker 506 in the recording timeline 508.

In one example, once the processor loads the video, the processor can cause the recording timeline to be displayed to indicate that the video is loaded. The processor can also cause the recording timeline to indicate the level or amount of the video that has been loaded such that the recording timeline indicates a loading status or process to the viewer of the display device.

In one example, the processor can also receive, from a second client device, user activity data associated with interactions by a second user with the website displayed on the second client device during a second session. The processor receives, from the second client device, a feedback data associated with the second session and the website. In this example, the feedback list user interface 502 that includes a second feedback entry in the plurality of entries. The second feedback entry comprises the feedback data associated with the website and the second session.

FIG. 5A to FIG. 5D illustrate examples of user interfaces displayed on the display device coupled to the member client device 102 to allow the viewer of the display device to assess the feedback provided.

Figure 5A:
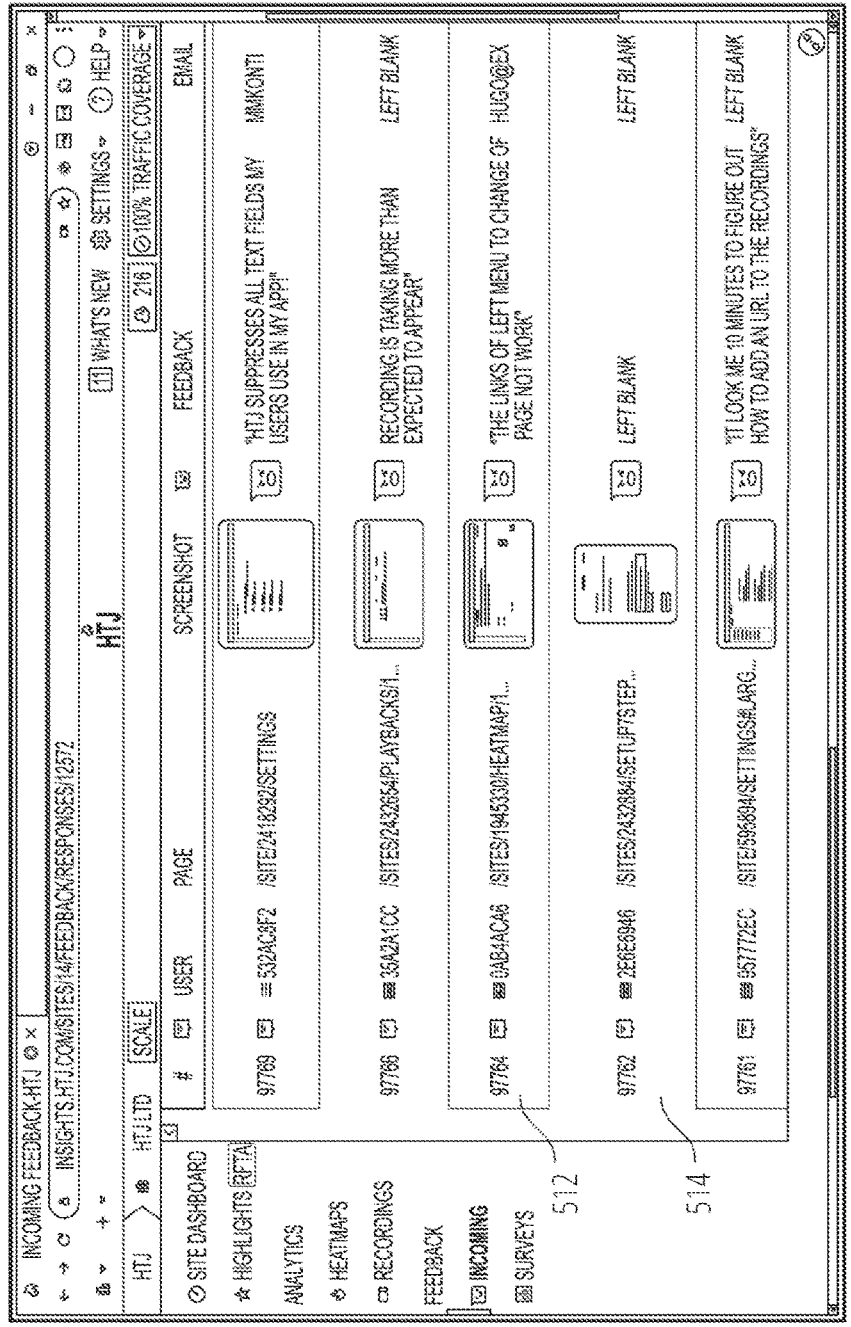
FIG. 5A illustrates a feedback list user interface 502 in accordance with one embodiment.

FIG. 5A illustrates a feedback list user interface 502 in accordance with one embodiment. The feedback list user interface 502 comprises feedback entries that are displayed in FIG. 5A as horizontal entries. The feedback entries in feedback list user interface 502 includes a first feedback entry 512 and a second feedback entry 514.

In this example, each of the feedback entries includes a user identifier associated with the user, a session identifier associated with the session, session details related to the session, an address of the one of the plurality of webpages associated with the feedback data, a screenshot of the one of the plurality of webpages, and the text input provided by the user in the feedback form. The first feedback entry 512, for instance, includes a user identifier of Oa84aca6, which is an anonymized identifier for the user. The user identifier also includes an image of a country's flag to indicate the location of the user (e.g., Spain). In FIG. 5A, the first feedback entry 512 includes the address of the webpage associated with the feedback data and the screenshot of the webpage. The first feedback entry 512 also includes the text input provided by the user as feedback (e.g., The links on left menu to change [the] page [do] not work"). As shown in FIG. 5A, the first feedback entry 512 can also include the image or emoji (e.g., angry face) that the user selected to represent a rating of the website, or a sentiment associated with the feedback provided.

Figure 5B:
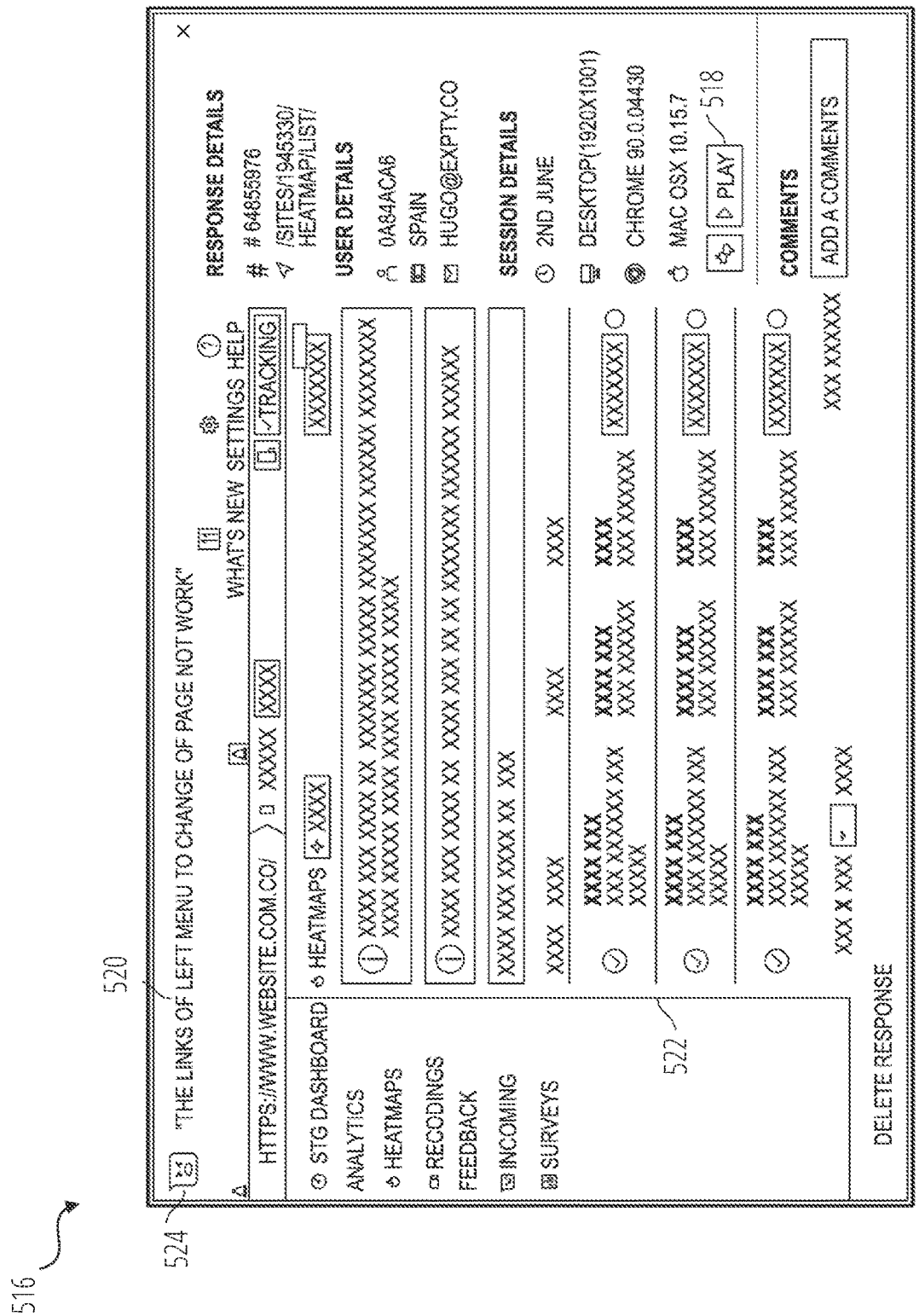
FIG. 5B illustrates a feedback entry detail user interface 516 in accordance with one embodiment.

When the first feedback entry 512 is selected in FIG. 5A, the feedback entry detail user interface 516 is caused to be displayed. FIG. 5B illustrates a feedback entry detail user interface 516 in accordance with one embodiment.

The feedback entry detail user interface 516 provides further details related to the first feedback entry 512. The feedback entry detail user interface 516 includes the user identifier, details on the user (e.g., country, email address) and details on the session such as the date of the user's session on the website, the information on the first user's client device and the browser used to navigate the website. As shown in FIG. 5B, the feedback entry detail user interface 516 also includes the text input 520 provided by the user as a feedback (e.g., The links on left menu to change [the] page [do] not work") and the rating 524, which is the image or emoji (e.g., angry face) that the user selected in the feedback form to represent a rating of the website or the sentiment related to the feedback provided. The feedback entry detail user interface 516 also includes a screenshot 522 of the webpage that associated with the feedback provided. By viewing the screenshot 522, the viewer of the display device displaying the feedback entry detail user interface 516 can have a view of the webpage that the user is referring to in the feedback. However, with the screenshot 522 alone, it may be difficult for the viewer to determine which particular elements on the webpage need to be fixed based on the feedback provided (e.g., The links on left menu to change [the] page [do] not work"). The feedback entry detail user interface 516 further includes a playback selectable item 518 that allows the viewer to view a playback of the user's interactions with the webpage in the screenshot 522. The playback of the user's interactions will provide the viewer with further context to determine the issues that the user is having with the website and is further describing in the feedback provided.

Figure 5C:
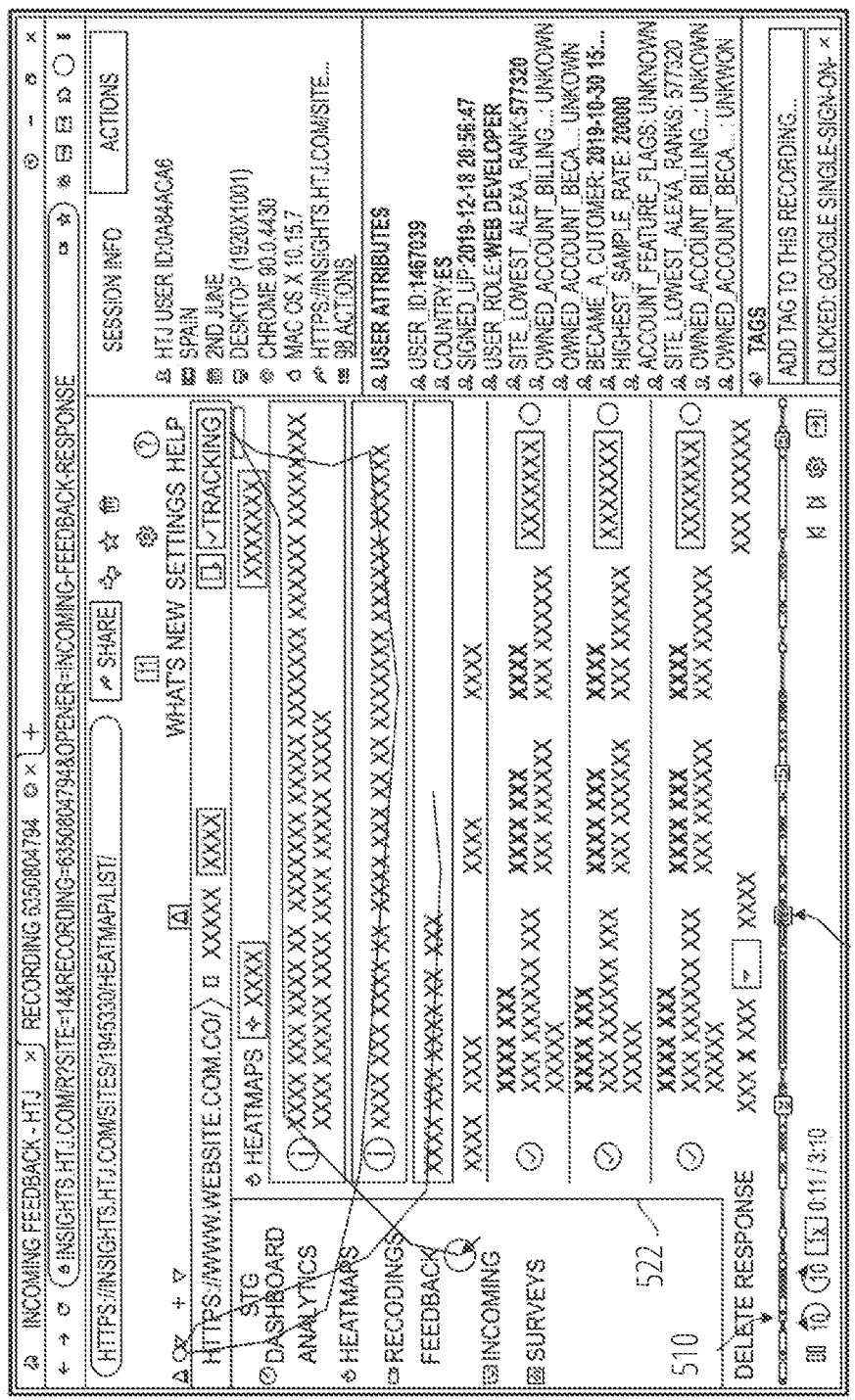
FIG. 5C illustrates a playback user interface 504 in accordance with one embodiment.

FIG. 5C illustrates a playback user interface 504 in accordance with one embodiment. The playback user interface 504 includes the visualization of the interactions by the first user with the website that cause the first user to provide the feedback data during the first session.

The playback user interface 504 includes a recording timeline 508 that includes a playback marker 510 to indicate the point in time in the visualization that is being displayed for viewing. The recording timeline 508 also includes a feedback marker 506 that indicates the point in time in the visualization that the first user provides the feedback data.

Figure 5D:
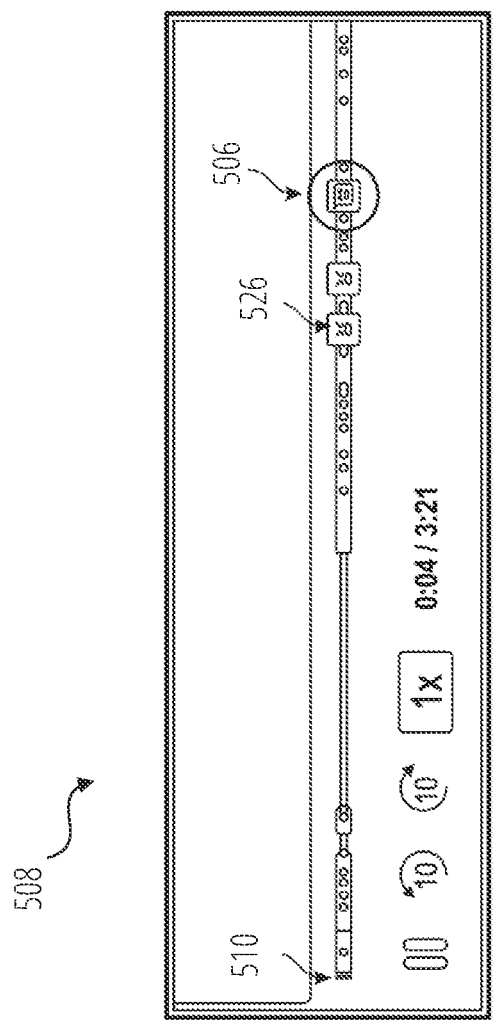
FIG. 5D illustrates the details of the recording timeline 508 in accordance with one embodiment.

FIG. 5D illustrates the details of the recording timeline 508 in accordance with one embodiment. As shown in FIG. 5D, the recording timeline 508 can include the playback marker 510 that indicates the point in time in the visualization that is being displayed for viewing and the feedback marker 506 that indicates the point in time in the visualization that the first user provides the feedback data. The recording timeline 508 can also include one or more frustration markers 526 which indicate points in time in the visualization that the first user is experiencing frustration with their interactions with the website. The frustrations can be detected based on an analysis of the user activity data associated with the first user's interactions with the website. For example, frustrations can be detected when the first user is determined to be performing rage clicks, looping through the same webpages of the website, reloading pages, hovering over the same items in the webpage, etc.

In FIG. 5D, the playback marker 510 can be caused to jump forward to at a point in the recording timeline 508 before the first frustration marker 526 in order to allow the viewer of the display device to view the visualization of the user's interactions that indicates frustrations prior to the feedback being provided.

Embodiments of the disclosure illustrate improvements made to the functionality of digital experience tracking systems by providing quick access to a playback of the most relevant portion of a visualization of the user's interactions with a website related to a user's feedback. Rather than leaving the impetus on the user to provide detailed feedback, the website owner is able to obtain the context necessary to decipher the user's feedback and make the proper adjustments to the website to avoid causing frustration to other users.

Machine Architecture

Figure 6:
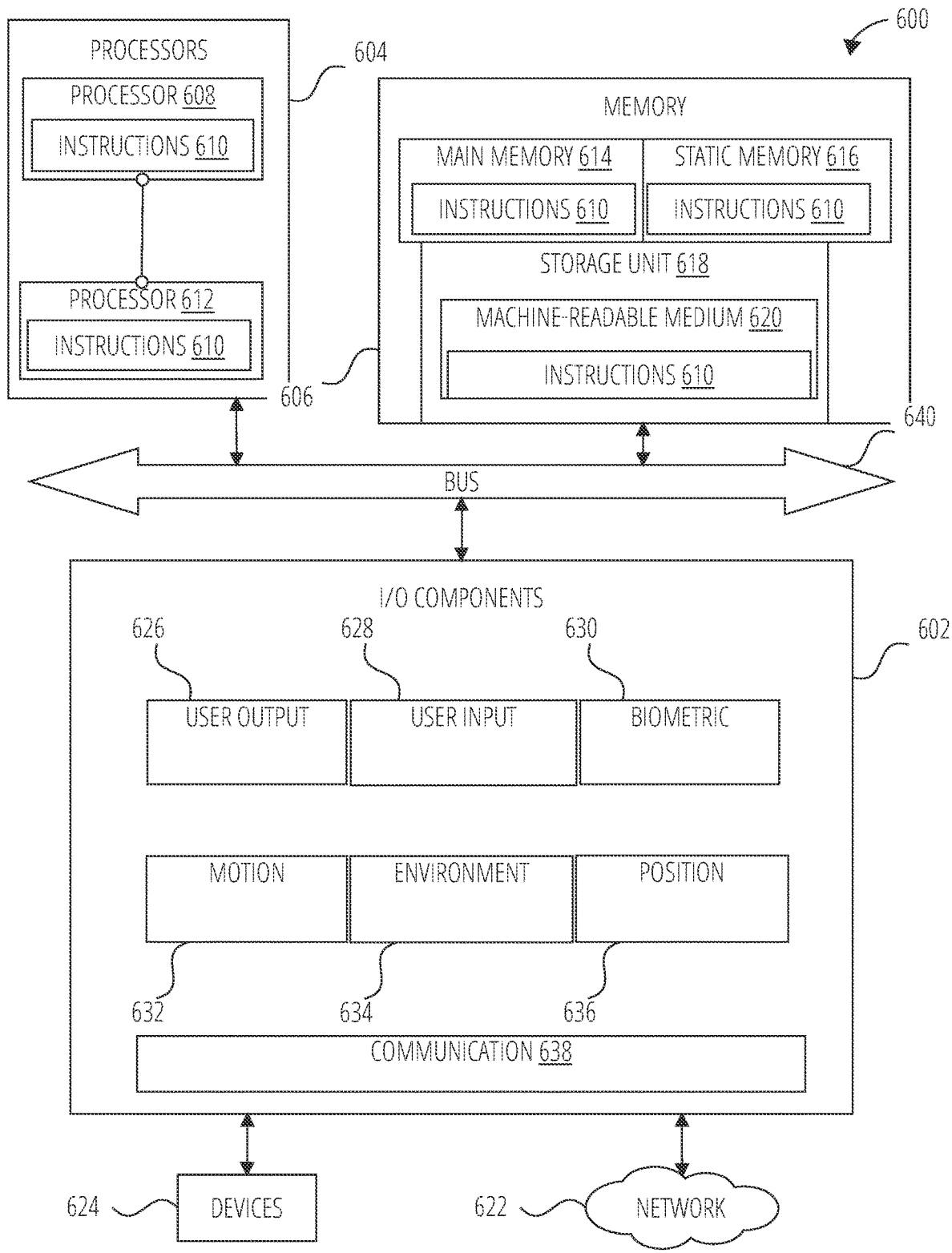
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 610 (e.g., software, a program, an application, an applet, an application, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the member client device 102 or any one of a number of server devices forming part of the experience analytics server 116. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 3600 camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera, and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi™ components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Software Architecture

Figure 7:
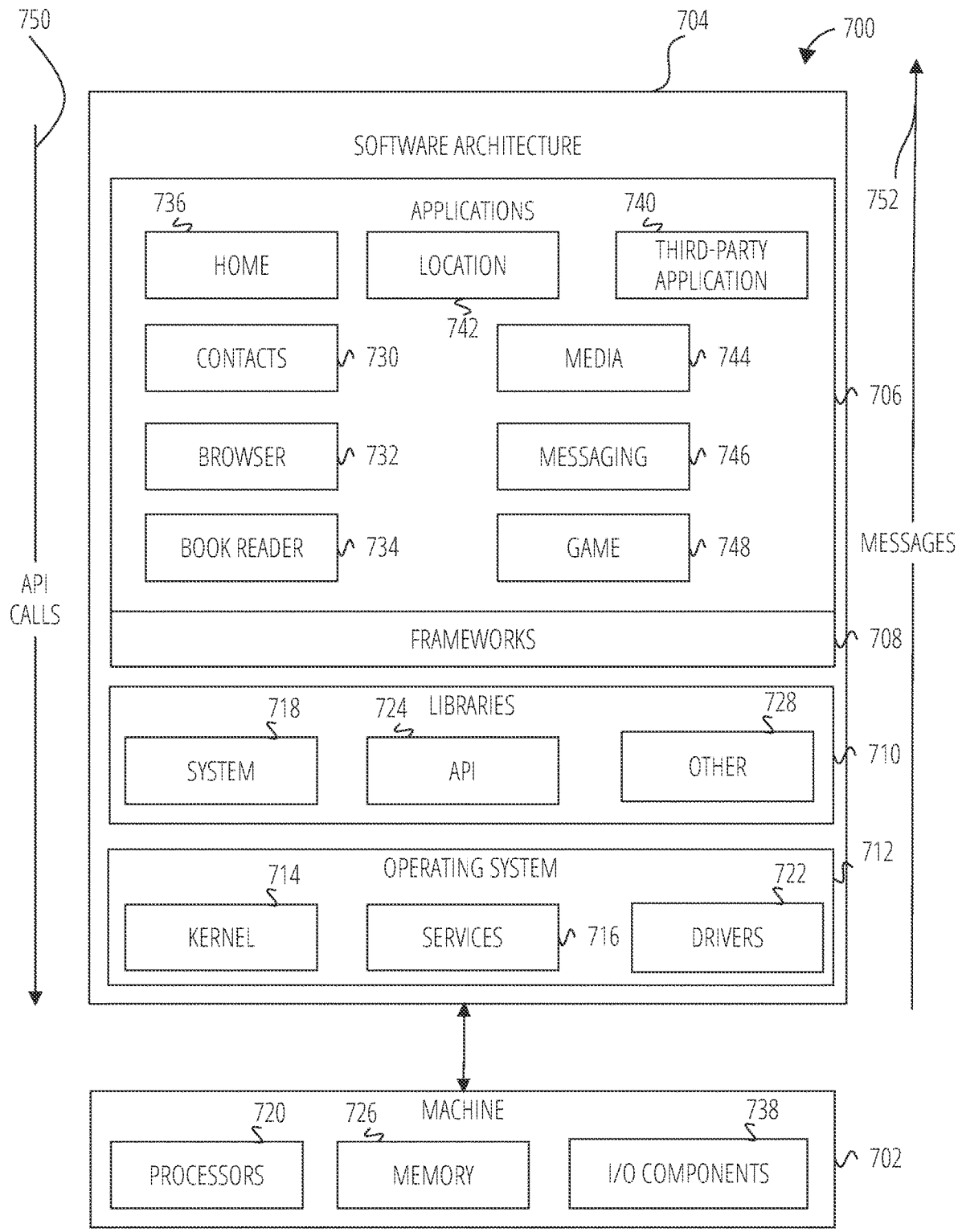
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
receiving, by a processor from a first client device, user activity data associated with interactions by a first user with a website displayed on the first client device, wherein the website comprises a plurality of webpages displayed during a first session;
receiving, from the first client device, feedback data that comprises a text input or a rating from the first user providing feedback on contents of website or the interactions by the first user with the website, wherein the feedback data is associated with the website and the first session;
causing a feedback list user interface to be displayed on a display device, the feedback list user interface comprising a plurality of feedback entries including a first feedback entry, the first feedback entry comprising the feedback data;
in response to receiving a selection of the first feedback entry,
causing a feedback entry detail user interface to be displayed on the display device, the feedback entry detail user interface including information on the first session, the feedback data, and a playback selectable item; and
in response to receiving a selection of the playback selectable item,
causing a playback user interface to be displayed on the display device, the playback user interface including a video comprising a visualization of interactions by the first user with the website prior to and including the first user providing the text input or the rating during the first session, wherein the playback user interface comprises a recording timeline associated with the visualization that includes a feedback marker that indicates a time position in the video that the first user provides the text input or the rating,
causing the video to jump forward to a start time that is a predetermined period of time prior to the time position in the video that the first user provides the text input or the rating, and
causing the video to be played back starting at the start time on the display device,
wherein the visualization of interactions by the first user with the website is generated based on the user activity data associated with the first user.

2. The method of claim 1, further comprising:
in response to receiving the selection of the playback selectable item,
loading the video on the playback user interface.

3. The method of claim 2, wherein loading the video further comprises:
causing the recording timeline to be displayed to indicate that the video is loaded.

4. The method of claim 3, wherein causing the video to jump forward to the start time further comprises:
causing a playback marker that indicates a playback time in the video to be positioned at a position on the recording timeline that corresponds to the start time, wherein the playback marker is positioned at the position in the recording timeline that is prior to a position of the feedback marker in the recording timeline.

5. The method of claim 1, wherein the text input from the first user is entered by the first user into a feedback form on the website on the first client device.

6. The method of claim 5, wherein the feedback form is displayed at the time in the visualization that the first user provides the text input or the rating.

7. The method of claim 5, wherein the feedback form is displayed in a pop-up window or tab of the website, an overlay of the website, one of the plurality of webpages of the website, or any combination thereof.

8. The method of claim 5, wherein the feedback data further comprises a survey response, the rating that includes an image, an emoticon, or an icon, a screenshot of one of the plurality of webpages, or any combination thereof.

9. The method of claim 5, wherein the first feedback entry further comprises a user identifier associated with the first user, a session identifier associated with the first session, session details related to the first session, an address of the one of the plurality of webpages associated with the feedback data, a screenshot of the one of the plurality of webpages, the text input, or any combination thereof.

10. The method of claim 1, further comprising:
receiving, by a processor from a second client device, user activity data associated with interactions by a second user with the website displayed on the second client device during a second session; and
receiving, from the second client device, a feedback data associated with the second session and the website,
wherein the feedback list user interface comprises the plurality of feedback entries including the first feedback entry and a second feedback entry, the second feedback entry comprising the feedback data associated with the website and the second session.

11. A system comprising:
a processor; and
a memory storing instructions that, when executed by the processor, cause the system to perform operations comprising:
receiving, from a first client device, user activity data associated with interactions by a first user with a website displayed on the first client device, wherein the website comprises a plurality of webpages displayed during a first session;
receiving, from the first client device, feedback data that comprises a text input or a rating from the first user providing feedback on contents of website or the interactions by the first user with the website, wherein the feedback data;
causing a feedback list user interface to be displayed on a display device, the feedback list user interface comprising a plurality of feedback entries including a first feedback entry, the first feedback entry comprising the feedback data associated with the website and the first session;
in response to receiving a selection of the first feedback entry,
causing a feedback entry detail user interface to be displayed on the display device, the feedback entry detail user interface including information on the first session, the feedback data, and a playback selectable item; and
in response to receiving a selection of the playback selectable item, causing a playback user interface to be displayed on the display device, the playback user interface including a video comprising a visualization of interactions by the first user with the website prior to and including the first user providing the text input or the rating during the first session, wherein the playback user interface comprises a recording timeline associated with the visualization that includes a feedback marker that indicates a time position in the video that the first user provides the text input or the rating,
causing the video to jump forward to a start time that is a predetermined period of time prior to the time position in the video that the first user provides the text input or the rating, and
causing the video to be played back starting at the start time on the display device, wherein the visualization of interactions by the first user with the website is generated based on the user activity data associated with the first user.

12. The system of claim 11, wherein the system to perform operations further comprising:
in response to receiving the selection of the playback selectable item,
loading the video on the playback user interface.

13. The system of claim 12, wherein loading the video further comprises:
causing the recording timeline to be displayed to indicate that the video is loaded.

14. The system of claim 13, wherein causing the video to jump forward to the start time further comprises:
causing a playback marker that indicates a playback time in the video to be positioned at a position on the recording timeline that corresponds to the start time, wherein the playback marker is positioned at the position in the recording timeline that is prior to a position of the feedback marker in the recording timeline.

15. The system of claim 11, wherein the text input from the first user is entered by the first user into a feedback form on the website on the first client device.

16. The system of claim 15, wherein the feedback form is displayed at the time in the visualization that the first user provides the text input or the rating.

17. The system of claim 15, wherein the feedback form is displayed in a pop-up window or tab of the website, an overlay of the website, one of the plurality of webpages of the website, or any combination thereof.

18. The system of claim 15, wherein the feedback data further comprises a survey response, the rating that includes an image, an emoticon, or an icon, a screenshot of one of the plurality of webpages, or any combination thereof.

19. The system of claim 15, wherein the first feedback entry further comprises a user identifier associated with the first user, a session identifier associated with the first session, session details related to the first session, an address of the one of the plurality of webpages associated with the feedback data, a screenshot of the one of the plurality of webpages, the text input, or any combination thereof.

20. The system of claim 11, wherein the system to perform operations further comprising:
receiving, by a processor from a second client device, user activity data associated with interactions by a second user with the website displayed on the second client device during a second session; and
receiving, from the second client device, a feedback data associated with the second session and the website,
wherein the feedback list user interface comprises the plurality of feedback entries including the first feedback entry and a second feedback entry, the second feedback entry comprising the feedback data associated with the website and the second session.

21. A non-transitory computer-readable storage medium, the computer-readable storage medium including instructions that when executed by a computer, cause the computer to perform operations comprising:

receiving, from a first client device, user activity data associated with interactions by a first user with a website displayed on the first client device, wherein the website comprises a plurality of webpages displayed during a first session;

receiving, from the first client device, feedback data that comprises a text input or a rating from the first user providing feedback on contents of website or the interactions by the first user with the website, wherein the feedback data is associated with the website and the first session;

causing a feedback list user interface to be displayed on a display device, the feedback list user interface comprising a plurality of feedback entries including a first feedback entry, the first feedback entry comprising the feedback data;

in response to receiving a selection of the first feedback entry, causing a feedback entry detail user interface to be displayed on the display device, the feedback entry detail user interface including information on the first session, the feedback data, and a playback selectable item; and in response to receiving a selection of the playback selectable item, causing a playback user interface to be displayed on the display device, the playback user interface including a video comprising a visualization of interactions by the first user with the website prior to and including the first user providing the text input or the rating during the first session, wherein the playback user interface comprises a recording timeline associated with the visualization that includes a feedback marker that indicates a time position in the video that the first user provides the text input or the rating, causing the video to jump forward to a start time that is a predetermined period of time prior to the time position in the video that the first user provides the text input or the rating, and causing the video to be played back starting at the start time on the display device, wherein the visualization of interactions by the first user with the website is generated based on the user activity data associated with the first user.

* * * * *

UNITED STATES PATENT AND TRADEMARK OFFICE
CERTIFICATE OF CORRECTION

| | | |
|---|---|---|
| PATENT NO. | : 12,045,444 B2 | Page 1 of 1 |
| APPLICATION NO. | : 17/876976 | |
| DATED | : July 23, 2024 | |
| INVENTOR(S) | : Magrico et al. | |

It is certified that error appears in the above-identified patent and that said Letters Patent is hereby corrected as shown below:

In the Specification

In Column 13, Line 16, delete "I/O" and insert --(I/O)-- therefor

In Column 14, Line 50, delete "3600" and insert --360°-- therefor

In Column 15, Line 9, delete "Wi-Fi™" and insert --Wi-Fi®-- therefor

Signed and Sealed this
Eighth Day of April, 2025

Coke Morgan Stewart
*Acting Director of the United States Patent and Trademark Office*